(12) United States Patent
Bennett

(10) Patent No.: US 9,587,374 B1
(45) Date of Patent: Mar. 7, 2017

(54) MOVABLE MACHINE AND METHOD FOR RAKING UNDESIRABLE PLANT MATTER

(71) Applicant: Thomas L. Bennett, Christoval, TX (US)

(72) Inventor: Thomas L. Bennett, Christoval, TX (US)

(*) Notice: Subject to any disclaimer, the term of this patent is extended or adjusted under 35 U.S.C. 154(b) by 0 days.

(21) Appl. No.: 14/933,462

(22) Filed: Nov. 5, 2015

(51) Int. Cl.
  *E02F 3/96* (2006.01)
  *A01D 89/00* (2006.01)
  *E01H 1/04* (2006.01)

(52) U.S. Cl.
  CPC ............ *E02F 3/962* (2013.01); *A01D 89/001* (2013.01); *E01H 1/04* (2013.01)

(58) Field of Classification Search
  CPC .... E01H 1/00; E01H 1/04; E01H 1/05; E01H 1/08; E01H 1/045
  USPC ............................................... 414/501; 15/83
  See application file for complete search history.

(56) References Cited

U.S. PATENT DOCUMENTS

| | | | | |
|---|---|---|---|---|
| 3,746,099 A * | 7/1973 | Black | ...................... | E01H 1/106 15/83 |
| 4,113,023 A * | 9/1978 | Baskett | .................. | A01B 43/00 171/19 |
| 5,060,732 A * | 10/1991 | Baskett | ................ | A01B 33/021 171/19 |
| 5,195,418 A * | 3/1993 | Smith | ...................... | G01G 5/04 91/31 |
| 5,369,832 A * | 12/1994 | Hagger | ................... | E01H 1/045 15/82 |
| 5,375,399 A * | 12/1994 | Kraft | .................... | A01D 34/005 15/347 |
| 5,577,286 A * | 11/1996 | Smith | .................... | E01H 1/047 15/179 |
| 6,357,993 B1 * | 3/2002 | Burton | ...................... | E02F 3/34 37/406 |
| 7,537,066 B1 * | 5/2009 | Flud | ........................ | E21B 44/02 175/122 |
| 2015/0068074 A1 * | 3/2015 | Mast | ....................... | E01H 5/045 37/197 |

* cited by examiner

*Primary Examiner* — Gregory Adams
*Assistant Examiner* — Ronald Jarrett
(74) *Attorney, Agent, or Firm* — Buskop Law Group, PC; Wendy Buskop

(57) ABSTRACT

A movable machine having a chassis, wheels and propulsion to be driven in a forward direction for raking undesirable plant matter. The chassis having a pair of arms, a loader bucket operable by a rotatable cylinder, a rake having three grates attached between the arms, a pair of movable controllable rake level adjusters to provide variable spacing between the loader bucket and the grates, a rotatable cylinder mounted across one end of the grates, a plurality of tines secured to the rotatable cylinder, and a hydraulic motor attached to the rotatable cylinder. The hydraulic motor configured to rotate the rotatable cylinder with plurality of tines as a single unit. A controller can operate the rake and the loader bucket as defined by a user.

15 Claims, 4 Drawing Sheets

FIGURE 5

| | |
|---|---|
| LOWERING A LOADER BUCKET USING A FORWARD AND REVERSE LOADER BUCKET CONTROLLER MOUNTED IN A CHASSIS OF A MOVEABLE MACHINE TO A SURFACE | 500 |
| ACTUATING A FORWARD ROLLER SWITCH ON THE FORWARD AND REVERSE LOADER BUCKET CONTROLLER | 502 |
| MOVING THE CHASSIS IN A FORWARD DIRECTION WITH THE LOADER BUCKET IN A FIRST POSITION ALIGNED WITH THE SURFACE | 504 |
| ROTATING A PLURALITY OF TINES CONNECTED TO A ROTATABLE CYLINDER TO PULL PLANT MATTER FROM THE SURFACE INTO THE LOADER BUCKET TO FILL THE LOADER BUCKET WITH PLANT MATTER | 506 |
| RELEASING THE FORWARD ROLLER SWITCH WHEN THE LOADER BUCKET IS FULL OF PLANT MATTER | 508 |
| LIFTING THE LOADER BUCKET OFF THE SURFACE | 510 |
| MOVING THE CHASSIS TO A DUMP LOCATION | 512 |
| ACTUATING A RAKE LIFT BUTTON ON THE FORWARD AND REVERSE LOADER BUCKET CONTROLLER TO OPEN THE RAKE | 514 |
| AISING THE LOADER BUCKET OFF THE SURFACE AND DUMPING THE PLANT MATTER FROM THE LOADER BUCKET USING THE FORWARD AND REVERSE LOADER BUCKET CONTROLLER MOUNTED IN THE CHASSIS | 516 |

MOVABLE MACHINE AND METHOD FOR RAKING UNDESIRABLE PLANT MATTER

FIELD

The present embodiments generally relate to a movable machine and method for raking undesirable plant matter.

BACKGROUND

A need exists for an easy to use device that does not remove natural grasses and only unwanted or undesirable plant matter, such as cactus, from an area or surface.

A need exists for an easy to use method to remove unwanted plant matter from acreage that does not remove natural grasses.

The present embodiments meet these needs.

BRIEF DESCRIPTION OF THE DRAWINGS

The detailed description will be better understood in conjunction with the accompanying drawings as follows:

FIG. 5 is a detail of the steps of the method for raking undesirable plant matter according to one or more embodiments.

Figure 1A:
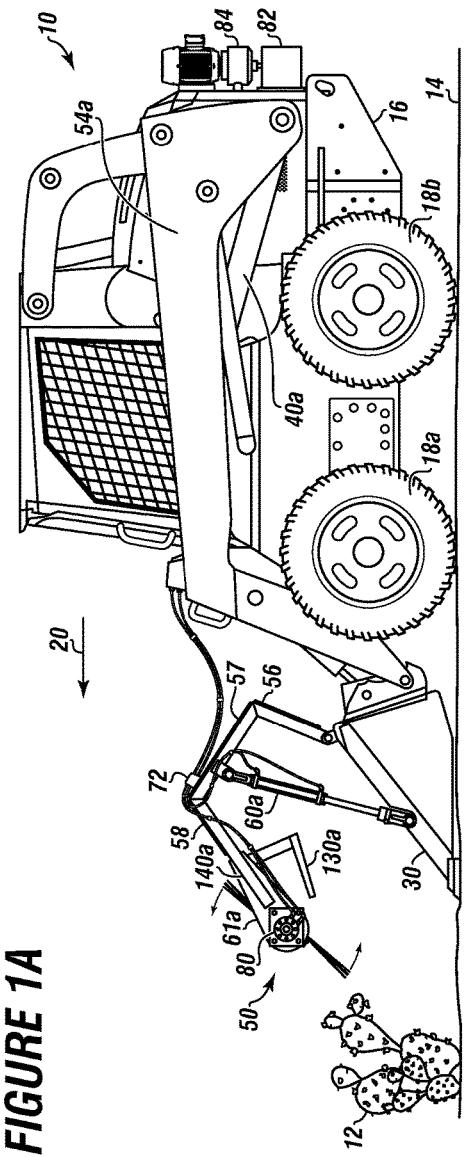
FIG. 1A is a first side view of the movable machine with a rake in a first position aligned with a surface according to one or more embodiments.

The present embodiments are detailed below with reference to the listed Figures.

DETAILED DESCRIPTION OF THE EMBODIMENTS

Before explaining the present apparatus and method in detail, it is to be understood that the apparatus and method are not limited to the particular embodiments and that they can be practiced or carried out in various ways.

Specific structural and functional details disclosed herein are not to be interpreted as limiting, but merely as a basis of the claims and as a representative basis for teaching persons having ordinary skill in the art to variously employ the present invention.

The embodiments generally relate to a movable machine for raking cactus or other undesirable or unwanted plant matter from acreage while leaving usable grasses.

The present embodiments further relate to a movable machine, such as a tractor with a hydraulic device for raking cactus and other undesirable plant matter from acreage, such as a ground surface, particularly at a ranch as well as the method for using the unique device.

The movable machine can have a chassis with movable wheels and a propulsion system. The propulsion system can enable the movable machine to be driven by a user in a forward direction. In embodiments, the movable machine can be driven in a forward direction or a reverse direction. The movable machine can have gears enabling the movable machine to be driven on a roadway if needed.

The chassis can have a pair of arms that can raise or lower a loader bucket.

The loader bucket can be operated by a hydraulic cylinder attached on one end on the loader bucket and on the opposite end to the chassis. In embodiments, two or three hydraulic cylinders can be used to raise and lower the loader bucket. All hydraulic cylinders can be operable from a forward and reverse loader bucket controller mounted in the chassis.

In embodiments, the loader bucket can contain from 0.5 cubic yards of material to 3 cubic yards of material.

A controllable, movable rake can be attached to the loader bucket.

The rake can be formed with three integral connected angled grates attached to the loader bucket. The three integral connected angled grates can be positioned between the pair of movable arms connected to the chassis.

A pair of movable controllable rake level adjusters can connect between the loader bucket and the three integral connected angled grates. The pair of movable controllable rake level adjusters can provide variable spacing between the loader bucket and the three integral connected angled grates.

In embodiments, the three integral connected angled grates can be contained by a frame.

A rotatable cylinder can be mounted across one end of the three integral connected angled grates.

In embodiments, the rotatable cylinder can be mounted to the frame when a frame is used to enclose the three integral connected angled grates.

In embodiments, each of the first grate, the second grate, and the third grate can have a length equivalent to or greater than a length of the rotatable cylinder.

In embodiments, a pair of extensions can be used. Each extension of the pair of extensions can be mounted to an opposite end of the third grate. The rotatable cylinder can be mounted between the pair of extensions.

A plurality of tines can be secured to the rotatable cylinder. In embodiments, the plurality of tines can be spaced apart from each other at a distance of 2 inches between tines to 6 inches between tines, such as 1 tine for every 4 inches of cylinder length.

A hydraulic motor can be attached to the rotatable cylinder. The hydraulic motor can be configured to rotate the rotatable cylinder with the plurality of tines as a single unit.

In embodiments, the hydraulic motor can rotate from 100 RPM to 300 RPM.

The hydraulic motor can be connected to a hydraulic reservoir with a hydraulic pump.

A forward and reverse loader bucket controller can be used to operate the rake and loader bucket as defined by a user.

The term "chassis" as used herein can refer to a frame, such as one with axles and a cab supporting a propulsion system which can additionally support a loader bucket.

In embodiments, the chassis can be a tractor, a skid steer, a car, a pick-up truck, and a bobcat.

The term "grate" as used herein can refer to a metal plate with a plurality of perforations formed therein. In embodiments, the term grate can refer to a wire mesh that enables air to pass but stops larger plant matter, such as sticks and cactus pads, from passing through the holes in the plate. In embodiments, each grate can have a planar configuration. In embodiments, the grates can overlap each other.

The term "ground engaging wheels" as used herein can be rubber wheels or metal wheels, such as truck tire wheels.

The term "forward and reverse loader bucket controller" as used herein can refer to a controller in the chassis that not only operates the loader bucket but additionally can be integral with it. Buttons on the forward and reverse loader bucket controller can be usable to operate the rake. The forward and reverse loader bucket controller can be operable by a user in the chassis or connected to a network for remote operation by a remote pilot. Remote operation can be performed by using a laptop or a computer connected to the network and viewing live feed from cameras mounted on the chassis.

The term "movable arms" as used herein can refer to the arms mounted to the chassis which can lift and lower the loader bucket.

The term "movable controllable rake level adjusters" as used herein can refer to hydraulic cylinders connected between the loader bucket and one of the three integrally connected grates. The three integrally connected grates can include a first grate, a second grate, and a third grate.

The term "movable machine" as used herein can refer to a device that is self-propelled, such as a battery operated tractor, gas operated bobcat, or other farm equipment which can run on solar, wind, fuel cells, diesel or another fuel. The movable machine can be operated by a user seated in the chassis, or the movable machine can be remotely controlled through a connection with the network, which can include cameras mounted on the chassis enabling a remote user to view field operations from a distance.

In embodiments, the movable machine can weigh about 8,770 pounds.

The term "frame" as used herein can refer to a frame that can be angled. The frame can be configured to contain each of the integrally connected grates providing additional durability and resistance to deformation when sticks and rocks impact the grates during operation of the rake. In embodiments, the frame can be one piece, such as a one piece unit.

The term "pair of extensions" as used herein can refer to an extension mounted to one end of the integrally connected grate. In embodiments, the rotatable cylinder can be mounted between the pair of extensions. In embodiments, the extensions can be metal plates. The metal plates can have a groove notch or cut in them for providing a secure, non-deforming connection to the integrally connected grates or to a frame surrounding the integrally connected grates.

The term "rotatable cylinder" as used herein can refer to a pipe that is hollow or to a rod that is solid. The rotatable cylinder can be formed from metal, such as aluminum, plastic, or a bi-material. Bi-material can be used if, for the purposes of weight, the rotatable cylinder needs a hard metal on the outside and a lighter weight material on the inside, such as a plastic.

In embodiments, the rotatable cylinder can have a diameter from 4 inches to 8 inches.

In embodiments, the inner diameter of the rotatable cylinder can be 6 inches.

In embodiments, the rotatable cylinder can be made from at least one of a steel, an iron, or an impact resistant plastic.

The term "surface" as used herein can refer to acreage or an outdoor or indoor area that has undesirable plant matter growing in it that needs clearing.

The term "tines" as used herein can refer to individual pieces of metal, which can be round wires or square shaped, that can be secured such as by welding to an outer surface of the rotatable cylinder. The tines can be spaced apart from each other. In embodiments, the tines can be solid or hollow rods extending away from the rotatable cylinder. In other embodiments, the tines can have a spring segment, such as wound wire with a helical shape, and then the remainder of the tine can extend away from the spring segment in a non-helical shape, such as in a straight line. If the "spring segment" embodiment is used, the tines can be formed from a metal wire and can have from two up to eight windings forming a biasing spring shape with the winding portion attached proximate to the rotatable cylinder simultaneously while the straight extension of the tine extends away from the rotatable cylinder.

The term "undesirable plant matter" as used herein can refer to but is not limited to cactus, small trees, and plant matter which may be toxic to livestock or otherwise harmful to acreage.

Figure 1B:
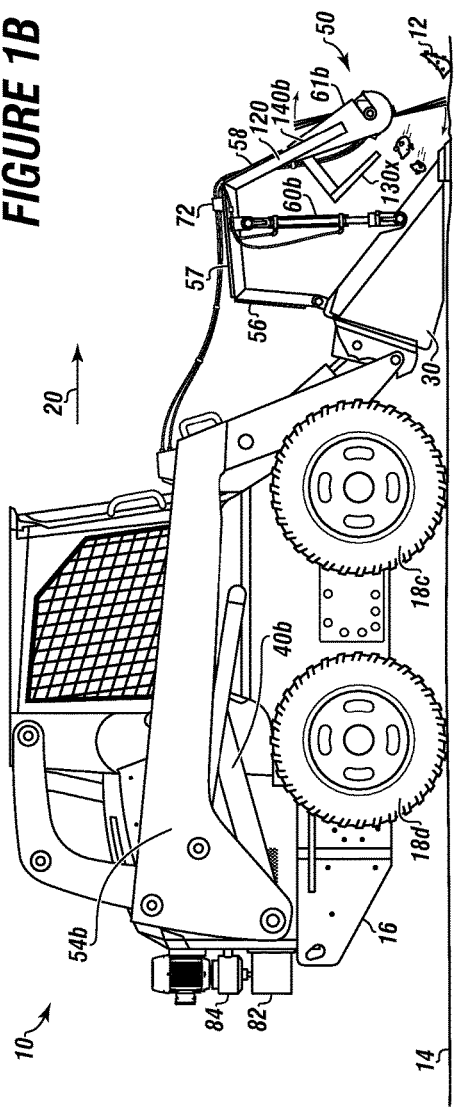
FIG. 1B is a second side view of the movable machine with the rake in the first position aligned with the surface according to one or more embodiments.

Turning now to the Figures, FIGS. 1A and 1B show opposite sides of a movable machine with a rake according to one or more embodiments.

The movable machine 10 can be raking undesirable plant matter 12 shown as prickly pear cactus from a surface 14.

The movable machine 10 can have a chassis 16 with ground engaging wheels 18a-18d.

The chassis 16 can be structured and operable to be driven in a forward direction 20. The chassis can have a pair of movable arms 54a and 54b mounted on opposite sides of the chassis.

A loader bucket 30 can be mounted between the pair of movable arms 54a and 54b.

A hydraulic lifting cylinder 40a can be connected on side of the chassis between the movable arm 54a and the chassis 16 and a hydraulic lifting cylinder 40b can be connected on side of the chassis between the movable arm 54b and the chassis. Both hydraulic lifting cylinders 40a and 40b can be used for lifting the loader bucket 30 from a first position aligned with the surface 14 to a second position not contacting the surface 14.

In embodiments, the hydraulic lifting cylinder can support from 800 pounds to 2000 pounds of load when elevated, where the load remains movable by the movable machine without deforming.

A rake 50 can be mounted to the loader bucket 30. In embodiments, the rake can weigh about 425 pounds.

In embodiments, the rake can be formed of a first grate 56, a second grate 57 and a third grate 58.

The first grate 56 can be connected to and extending across the loader bucket 30. The first grate 56 can be pivotable.

The second grate 57 can also extend across the loader bucket 30. The second grate can integrally connect at a first angle to the first grate 56.

The third grate 58 can extend across the loader bucket. The third grate 58 can integrally connect at a second angle to the second grate 57.

A pair of movable controllable rake level adjusters 60a and 60b can be connected to provide variable spacing between the loader bucket 30 and at least one of the integrally connected grates.

The pair of movable controllable rake level adjusters can include a 2.5 inch bore and a 12 inch stroke. Also, the pair of movable controllable rake level adjusters can have a working pressure of 2,500 psi.

A pair of extensions 61a and 61b wherein each extension can be mounted to the same end but on an opposite side of the third grate 58.

A hydraulic motor 80 can connect fluidly to a hydraulic reservoir 82 with a hydraulic pump 84.

A hydraulic control valve 72 can be connected between the hydraulic motor 80 and the hydraulic pump 84 that engages the hydraulic reservoir 82.

In embodiments, the hydraulic control valve can be a two way hydraulic control valve with a bypass.

Hoses can be used between the hydraulic reservoir 82, the hydraulic pump 84 and the hydraulic motor 80 to ensure the fluid connection.

A plurality of fixed forks 130a-130x can be mounted at a fork angle to the first grate 56.

In embodiments, each of the extensions 61a and 61b can have a notch 140a and 140b for engaging an end of the first grate, the second grate, or the third grate.

In embodiments, the pair of extensions 61a and 61b can be mounted to a frame 120.

Figure 2:
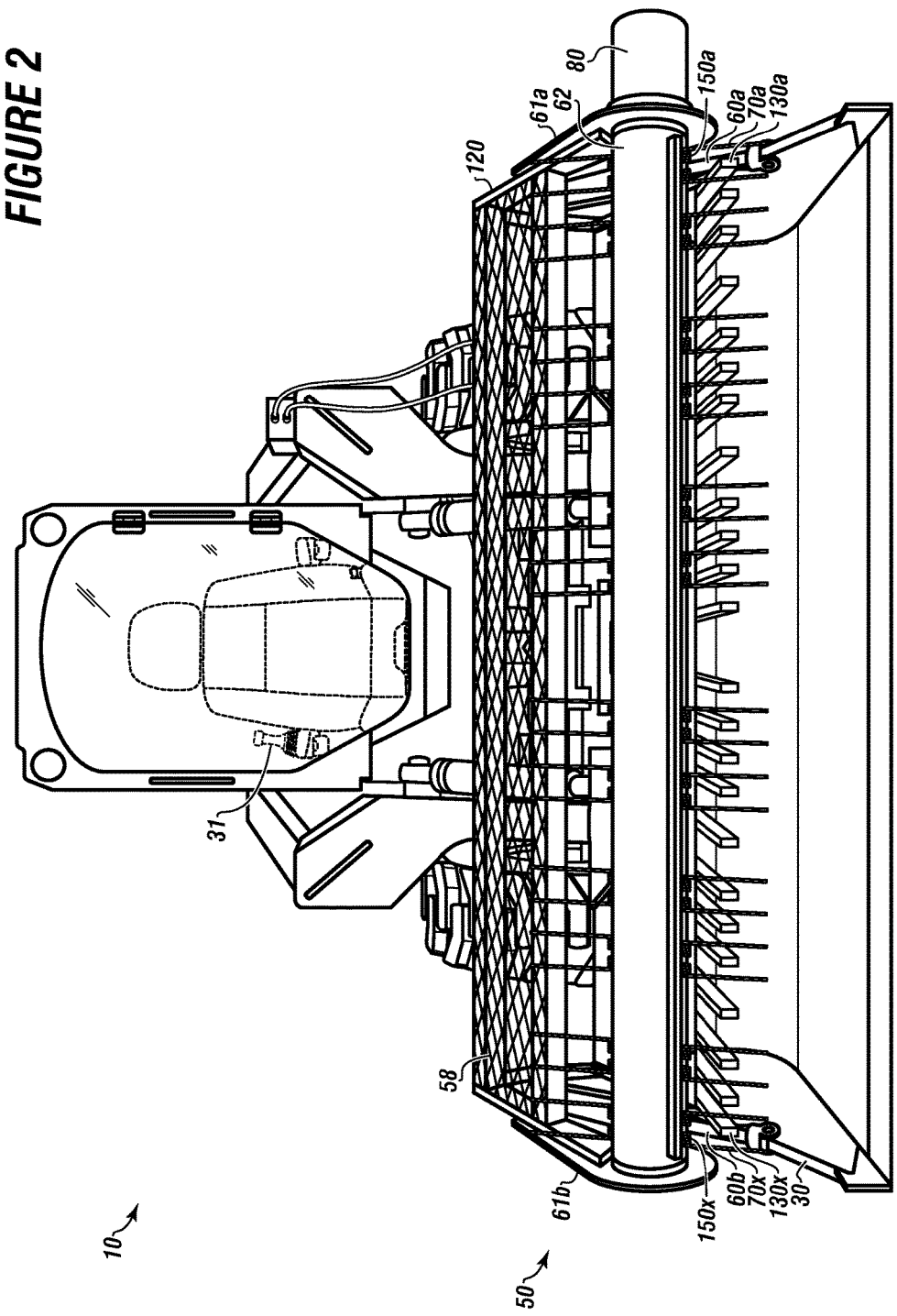
FIG. 2 is a front view of the movable machine with the rake according to one or more embodiments.

FIG. 2 is a front view of the movable machine with the rake according to one or more embodiments.

The movable machine 10 is shown with the rake 50, wherein the rake can be mounted to the loader bucket 30.

The movement of the loader bucket 30 can be controlled by a forward and reverse loader bucket controller 31 mounted in the chassis.

The hydraulic motor 80 can be attached to a rotatable cylinder 62, wherein the hydraulic motor 80 can be configured to rotate the rotatable cylinder 62.

In embodiments, the rotatable cylinder 62 can be mounted between the pair of extensions 61a and 61b.

The pair of extensions 61a and 61b can be mounted to the frame 120. In embodiments, the frame can contain the three grates, but only the third grate 58 is labeled. In embodiments the grates can be integrally connected grates.

In embodiments, the first grate, the second grate, and the third grate can be surrounded by the frame 120. In embodiments, the frame can be a one piece unit.

The pair of movable controllable rake level adjusters 60a and 60b can engage opposing sides of the frame 120.

In embodiments, the pair of movable controllable rake level adjusters 60a and 60b can be connected to provide variable spacing between the loader bucket 30 and at least one of the grates.

The movable machine 10 can include plurality of tines 70a-70x, which can be secured to the rotatable cylinder 62.

In embodiments, the plurality of tines can be positioned in a spaced apart relationship to each other.

In embodiments, the hydraulic motor 80 can be configured to rotate the rotatable cylinder 62 with the plurality of tines 70a-70x as a single unit.

The movable machine 10 can have the plurality of fixed forks 130a-130x mounted at a fork angle 131 to the first grate.

Each fixed fork can be positioned at a location between a pair of tines.

Each fixed fork can be positioned adjacent the rotatable cylinder.

In embodiments, each tine of the plurality of tines 70a-70x can have a spring segment 150a-150x for providing flexibility, strength, and an ability to reduce breakage upon impact with rocks.

Figure 3:
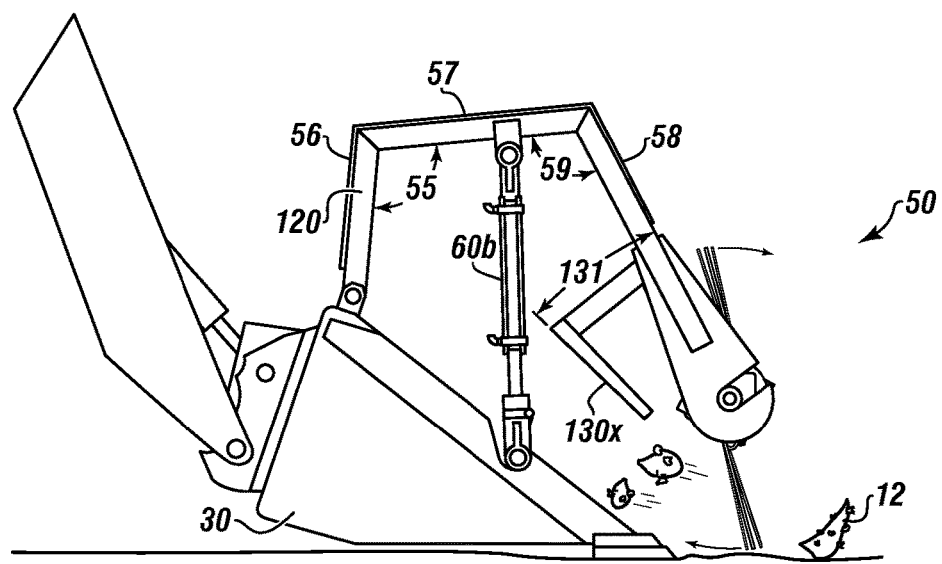
FIG. 3 is a detailed side view of the rake according to one or more embodiments.

FIG. 3 is a detailed side view of the rake according to one or more embodiments.

The rake 50 for removing undesirable plant matter 12 is shown with the loader bucket 30 attached to the first grate 56, the second grate 57, and the third grate 58.

The second grate 57 can be integrally connected at a first angle 55 to the first grate 56.

The third grate can be integrally connected at a second angle 59 formed between the second grate 57 and third grate 58.

The pair of movable controllable rake level adjusters 60b can be connected to provide variable spacing between the loader bucket 30 and at least one of the grates.

Fixed fork 130x of the plurality of fixed forks is shown mounted at a fork angle 131 to the first grate 58.

It should be noted that each fixed fork can be positioned at a location between a pair of tines. Each fixed fork can be positioned adjacent the rotatable cylinder.

Figure 4:
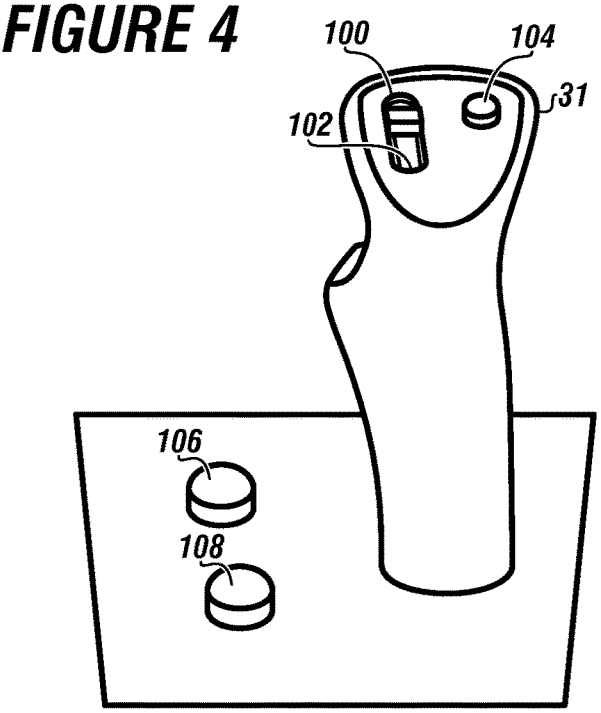
FIG. 4 is a top view of a forward and reverse loader bucket controller according to one or more embodiments.

FIG. 4 is a top view of a forward and reverse loader bucket controller according to one or more embodiments.

The forward and reverse loader bucket controller 31 can move the loader bucket in an upward direction and a downward direction. The forward and reverse loader bucket controller can also include but is not limited to a forward roller switch 100, a reverse roller switch 102, and a rake lift button 104. The forward and reverse loader bucket controller can be configured to operate the rake to variable heights from the surface as defined by a user.

In embodiments, when the forward roller switch 100 is released, the forward roller switch can revert to a neutral position which can stop movement of the rotatable cylinder. In embodiments, when the reverse roller switch 102 is released, the reverse roller switch can revert to a neutral position which can stop movement of the rotatable cylinder.

In embodiments, the forward and reverse loader bucket controller 31 can have an emergency stop button 106.

In embodiments, the forward and reverse loader bucket controller 31 can have a dump button 108.

In embodiments, the forward and reverse loader bucket controller 31 can be an integral one piece unit.

FIG. 5 is a detail of the steps of the method for raking undesirable plant matter according to one or more embodiments.

The method can include lowering a loader bucket using a forward and reverse loader bucket controller mounted in a chassis of a movable machine to a surface, as illustrated in box 500.

The method can include actuating a forward roller switch on the forward and reverse loader bucket controller, as illustrated in box 502.

The method can include moving the chassis in a forward direction with the loader bucket in a first position aligned with the surface, as illustrated in box 504.

The method can include rotating a plurality of tines connected to a rotatable cylinder to pull plant matter from the surface into the loader bucket to fill the loader bucket with plant matter, as illustrated in box 506.

The method can include releasing the forward roller switch when the loader bucket is full of plant matter, as illustrated in box 508.

The method can include lifting the loader bucket off the surface, as illustrated in box 510.

The method can include moving the chassis to a dump location, as illustrated in box 512.

The method can include actuating a rake lift button on the forward and reverse loader bucket controller to open the rake, as illustrated in box 514.

The method can include raising the loader bucket off the surface and dumping the plant matter from the loader bucket using the forward and reverse loader bucket controller mounted in the chassis, as illustrated in box 516.

While these embodiments have been described with emphasis on the embodiments, it should be understood that within the scope of the appended claims, the embodiments might be practiced other than as specifically described herein.

What is claimed is:

1. A movable machine for raking undesirable plant matter from a surface comprising:

a) a chassis having ground engaging wheels, the chassis structured and operable to be driven in a forward direction, the chassis having a pair of movable arms mounted on opposite sides of the chassis;
b) a loader bucket controlled by a forward and reverse loader bucket controller mounted in the chassis, the loader bucket connected between the pair of movable arms;
c) at least one hydraulic lifting cylinder connected between a movable arm of the pair of movable arms and the chassis, the at least one hydraulic lifting cylinder for lifting the loader bucket from a first position aligned with the surface to a second position not contacting the surface; and
d) a hydraulically movable rake mounted to the loader bucket for operating between a raised position and a lowered position while mounted to the loader bucket, the hydraulically movable rake comprising:
  (i) a first grate extending across the loader bucket;
  (ii) a second grate extending across the loader bucket, the second grate integrally connected at a first angle to the first grate;
  (iii) a third grate extending across the loader bucket, the third grate integrally connected at a second angle to the second grate;
  (iv) a pair of movable hydraulically controllable rake level adjusters connected between the bucket and the hydraulically movable rake to provide variable spacing between the loader bucket and the first grate, the second grate, or the third grate;
  (v) a pair of extensions, each extension of the pair of extensions mounted on opposite sides of an end of the third grate;
  (vi) a rotatable cylinder mounted between the pair of extensions;
  (vii) a plurality of tines secured to the rotatable cylinder, the plurality of tines positioned in a spaced apart relationship to each other;
  (viii) a hydraulic motor attached to the rotatable cylinder, the hydraulic motor configured to rotate the rotatable cylinder with the plurality of tines as a single unit, the hydraulic motor connected to a hydraulic reservoir with a hydraulic pump;
  (ix) a hydraulic control valve connected between the hydraulic motor and the hydraulic pump;
  (x) a forward roller switch, a reverse roller switch, and a rake lift button integral with the forward and reverse loader bucket controller, the forward and reverse loader bucket controller configured to operate the hydraulically movable rake to variable heights from the surface as defined by a user;
  (xi) a plurality of fixed forks mounted to the third grate, such that the fixed forks are raised and lowered with the third grate by the movable hydraulically controllable rake level adjusters, each fixed fork of the plurality of fixed forks are positioned at a location between a pair of tines of the plurality of tines, each fixed fork of the plurality of fixed forks positioned adjacent the rotatable cylinder; and
  wherein the movable machine is configured to provide loader bucket use and hydraulically movable rake use.

2. The movable machine for raking undesirable plant matter from the surface of claim 1, wherein the first grate, the second grate, and the third grate are surrounded by a frame and the pair of movable hydraulically controllable rake level adjusters engages opposing sides of the frame.

3. The movable machine for raking undesirable plant matter from the surface of claim 1, wherein the chassis is a tractor, a skid steer, a car, a pick-up truck, or a bobcat.

4. The movable machine for raking undesirable plant matter from the surface of claim 1, wherein the loader bucket contains from 0.5 cubic yards of material to 3 cubic yards of material.

5. The movable machine for raking undesirable plant matter from the surface of claim 1, wherein the at least one hydraulic lifting cylinder supports from 800 pounds to 2000 pounds of load when elevated and wherein the load remains movable by the movable machine without deforming.

6. The movable machine for raking undesirable plant matter from the surface of claim 1, wherein each of the extensions comprises a notch for engaging an end of the first grate, the second grate, or the third grate.

7. The movable machine for raking undesirable plant matter from the surface of claim 1, wherein each of the first grate, the second grate, and the third grate has a length equivalent to or greater than a length of the rotatable cylinder.

8. The movable machine for raking undesirable plant matter from the surface of claim 1, wherein the rotatable cylinder has a diameter from 4 inches to 8 inches.

9. The movable machine for raking undesirable plant matter from the surface of claim 1, wherein the rotatable cylinder comprises at least one of: a steel, an iron, or an impact resistant plastic.

10. The movable machine for raking undesirable plant matter from the surface of claim 1, wherein the plurality of tines are spaced apart from each other a distance of 2 inches between tines to 6 inches between tines.

11. The movable machine for raking undesirable plant matter from the surface of claim 1, wherein each tine of the plurality of tines comprises a spring segment for providing flexibility, strength, and an ability to reduce breakage upon impact with rocks.

12. The movable machine for raking undesirable plant matter from the surface of claim 1, comprising an emergency stop button on the forward and reverse loader bucket controller.

13. The movable machine for raking undesirable plant matter from the surface of claim 1, wherein the hydraulic motor rotates from 100 RPM to 300 RPM.

14. The movable machine for raking undesirable plant matter from the surface of claim 1, wherein the hydraulic control valve is a two way hydraulic control valve with a bypass.

15. A method for raking undesirable plant matter comprising:
  a) providing the movable machine of claim 1;
  b) lowering the loader bucket using the forward and reverse loader bucket controller mounted in the chassis of the movable machine to the surface and hydraulically raising the hydraulically movable rake mounted to the loader bucket;
  c) actuating the forward roller switch on the forward and reverse loader bucket controller to initiate rolling of the rotatable cylinder mounted in the hydraulically movable rake;
  d) moving the chassis in the forward direction with the loader bucket in the first position aligned with the surface while the rotatable cylinder is rotating;
  e) rotating the plurality of tines connected to the rotatable cylinder to pull the undesirable plant matter from the surface into the loader bucket to fill the loader bucket with the undesirable plant matter;

f) releasing the forward roller switch when the loader bucket is full of the undesirable plant matter;
g) lifting the loader bucket off the surface;
h) moving the chassis to a dump location;
i) actuating the rake lift button on the forward and reverse loader bucket controller to open the hydraulically movable rake mounted to the loader bucket; and
j) raising the loader bucket off the surface and dumping the undesirable plant matter from the loader bucket using the forward and reverse loader bucket controller mounted in the chassis.

\* \* \* \* \*